No. 697,088. Patented Apr. 8, 1902.
M. I. HOWE.
SELF FEEDER FOR THRESHERS.
(Application filed Dec. 26, 1900.)
(No Model.) 2 Sheets—Sheet 2.
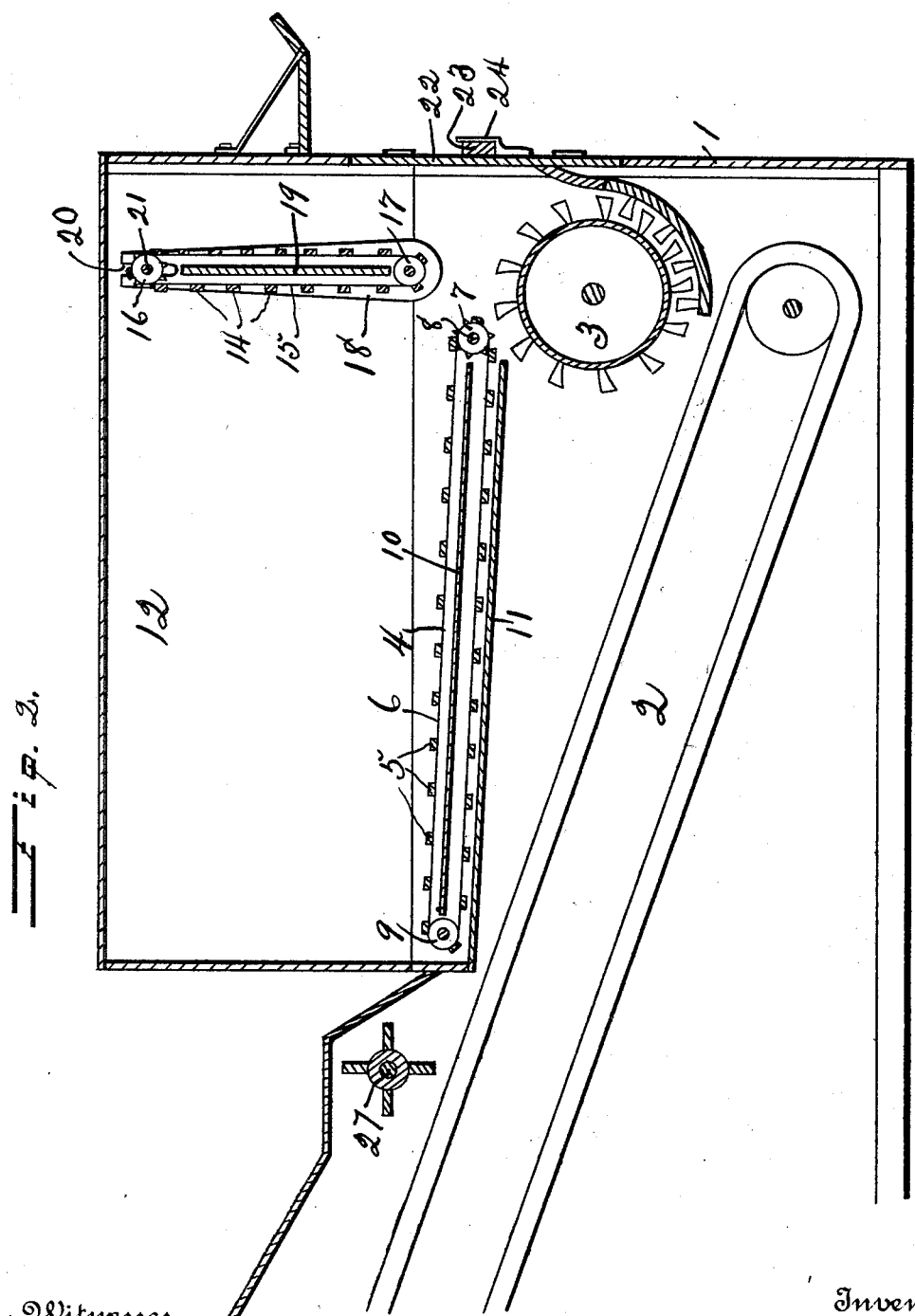

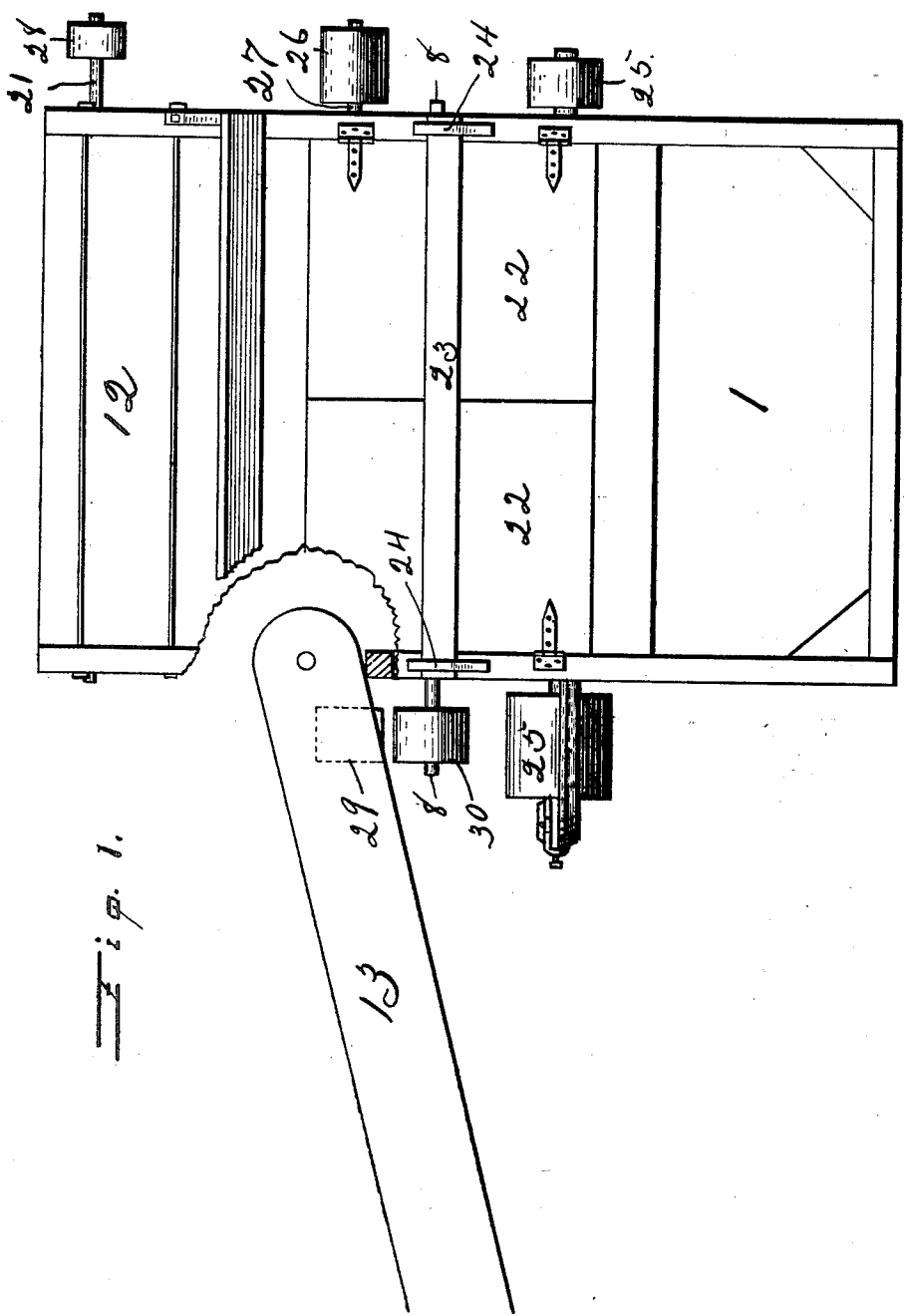

UNITED STATES PATENT OFFICE.

MAYNARD I. HOWE, OF STOCKTON, CALIFORNIA.

SELF-FEEDER FOR THRESHERS.

SPECIFICATION forming part of Letters Patent No. 697,088, dated April 8, 1902.

Application filed December 26, 1900. Serial No. 41,116. (No model.)

*To all whom it may concern:*

Be it known that I, MAYNARD I. HOWE, a citizen of the United States, residing at Stockton, in the county of San Joaquin and State of California, have invented certain new and useful Improvements in Self-Feeders for Threshers; and I do declare the following to be a full, clear, and exact description of the invention, such as will enable others skilled in the art to which it appertains to make and use the same, reference being had to the accompanying drawings, and to the figures marked thereon, which form a part of this specification.

My invention relates to feeders adapted to introduce unthreshed grain into threshing-machines, and more particularly to that class designed to feed said grain automatically.

My object is to furnish a machine wherewith unthreshed grain may be carried to the cylinder of a threshing-machine and which will present said grain continuously and evenly to said cylinder.

Also it is my object to produce a machine which is simplified in its construction and operation and which may be cheaply constructed.

These objects are accomplished by the use of slat drapers arranged on the front end of the machine, over the cylinder, and such other devices and combination of devices as will be shown herein and pointed out in the claims hereunto annexed, reference being had to the accompanying drawings for a better comprehension hereof, in which—

Figure 1 is a front view of a separator having my improved feeder thereunto attached. Fig. 2 is a longitudinal section through the center of the same, showing the feeder in position.

Similar figures of reference indicate corresponding parts in the several views.

The front end of a threshing-machine 1 is provided with the usual grain-draper 2 for conveying the threshed grain to the shoe. (Not shown.) The usual cylinder 3 is mounted and journaled in position near the front end of the machine in suitable journal-bearings.

My improved feeder is mounted above the cylinder 3 and grain-draper 2 and is composed, most essentially, of a draper 4, made of slats 5, running transversely, and the usual sprocket-chains 6, which are attached to said slats 5 and adapted to engage with sprocket-wheels 7, rigidly attached to a shaft 8, journaled transversely in the frame of the machine above and slightly to the rearward of the cylinder 3. The rear end of the draper passes over a roller 9, suitably journaled in the sides of the machine. A board or table 10 is interposed and rigidly secured between the roller 9 and shaft 8 for the purpose of preventing the straw from dropping between the slats of the draper 4.

Beneath the draper 4 I arrange a substantial floor 11 to protect the said draper 4 from the flying straw and grain as it comes through the cylinder.

Over the draper 4 I arrange a hood 12, which has one side open to receive a conveyer or spout 13, which is usually employed on threshing-machines to convey the unthreshed grain to the feeder. Near the front end of the hood and directly over the cylinder 3 I arrange a swinging draper composed of the transversely-disposed slats 14, the chain-belts 15, to which the slats 14 are rigidly attached, and the sprocket-wheels 16, rigidly attached to a shaft 21, which is suitably journaled in the sides of the hood 12, near the top thereof. The lower end of the swinging draper is adapted to be supported on and guided by a roller 17, which is journaled in bars 18, which are rigidly attached together by a board 19 and in conjunction with said board form the draper-frame. The top ends of the frame-bars 18 are provided with slots 20, which receive the shaft 21. The said slots are also provided so as to allow the weight of the draper-frame and roller 17 to hang on the chains 15, and thereby maintain the draper against slack and wear attendant upon the operation thereof.

The end of the machine 1, directly in front of the cylinder 3, is formed into two doors 22, which are properly hinged, as shown in Fig. 1, and held in closed position by a bar 23, which is placed across the said doors and has its ends secured behind hooks or cleats 24.

The cylinder 3 has a pulley 25 arranged on either end, one of which is adapted to impart motion to a pulley 26, which is rigidly attached to the beater-shaft 27 by means of a suitable belt. The shaft 21 has a pulley 28 rigidly attached thereon and has motion communicated thereto by a suitable belt engaging with the pulley 26. The beater-shaft 27 has a pulley 29 rigidly secured to its free end. The shaft 8 has a pulley 30 attached thereto, so as to be engaged by a belt driven by the pulley 29.

The mode of operating my improved feeder is as follows: The different parts having been placed in position, as shown and described, the grain, unthreshed, is introduced on the draper or conveyer 13, which carries the same into the hood 12, whereupon said grain is deposited upon the draper 4 and carried forward toward the cylinder 3. The said grain when deposited on the draper 4 is loose and sometimes in bunches, and if carried to and allowed to go through the cylinder in such shape good results are not obtained. As the contents of the hood 12 are carried forward the swinging draper recedes and allows the bunch, if there be any, to move along, and at the same time said swinging draper presses said grain downward toward the cylinder 3, which combs the straw little by little until the bunch is carried away and passes through the cylinder in an even and effectual manner.

By allowing the vertically-disposed draper to swing the grain is not forced upon the cylinder immediately and all at once.

Another advantage of my improved feeder is that the same being in the rear of the cylinder said cylinder is easy of access from the front.

I am well aware that feeders have been constructed which comprise drapers, and that feature I do not claim broadly; but What I do claim as new, and desire to secure by Letters Patent, is—

In a feeder of the class described, the combination with the casing, and the threshing-cylinder of a threshing-machine; of a draper arranged to receive grain and convey it to the cylinder, a transverse shaft 21 journaled in the casing, and disposed above the cylinder, and the pendent draper for regulating the feed of grain to the cylinder; the said draper comprising sprockets 16 on the shaft 21, side bars 18 having slots 20 receiving said shaft 21 whereby they are enabled to swing and move in the direction of their length on the same, a roller 17 journaled in the lower portions of the bars 18, chains passed around the sprockets 16 and roller 17, and means on said chains for engaging the grain.

In testimony whereof I affix my signature in presence of two witnesses.

MAYNARD I. HOWE.

Witnesses:
  JOSHUA B. WEBSTER,
  M. HAYNES.